(No Model.)

F. J. TORRANCE.
CULINARY VESSEL.

No. 397,098. Patented Jan. 29, 1889.

WITNESSES
Albert B. Blackwood
Louise Paul

INVENTOR
Francis J. Torrance
By Connolly Bros. Attys

UNITED STATES PATENT OFFICE.

FRANCIS J. TORRANCE, OF ALLEGHENY, PENNSYLVANIA.

CULINARY VESSEL.

SPECIFICATION forming part of Letters Patent No. 397,098, dated January 29, 1889.

Application filed June 29, 1888. Serial No. 278,564. (No model.)

*To all whom it may concern:*

Be it known that I, FRANCIS J. TORRANCE, a citizen of the United States, residing at Allegheny, in the county of Allegheny and State of Pennsylvania, have invented certain new and useful Improvements in Culinary Vessels; and I do hereby declare the following to be a full, clear, and exact description of the invention, such as will enable others skilled in the art to which it appertains to make and use the same.

This invention has relation to hollow cast-iron culinary vessels, and has particular relation to that class known as sauce or stew pans, in which a handle is rigidly attached to one side of the pan at or near the upper edge thereof.

This invention consists in the provision of a culinary vessel in which the upper edge or rim is slightly flared and finished with an angular or V-shaped flange, instead of being rounded.

This invention further consists in the provision of an ear or lug cast integral with the body of the vessel, and designed and adapted to have the handle rigidly attached thereto.

This invention still further consists in the construction, arrangement, and combination of parts more fully described hereinafter, and specifically pointed out in the claims.

Figure 1:
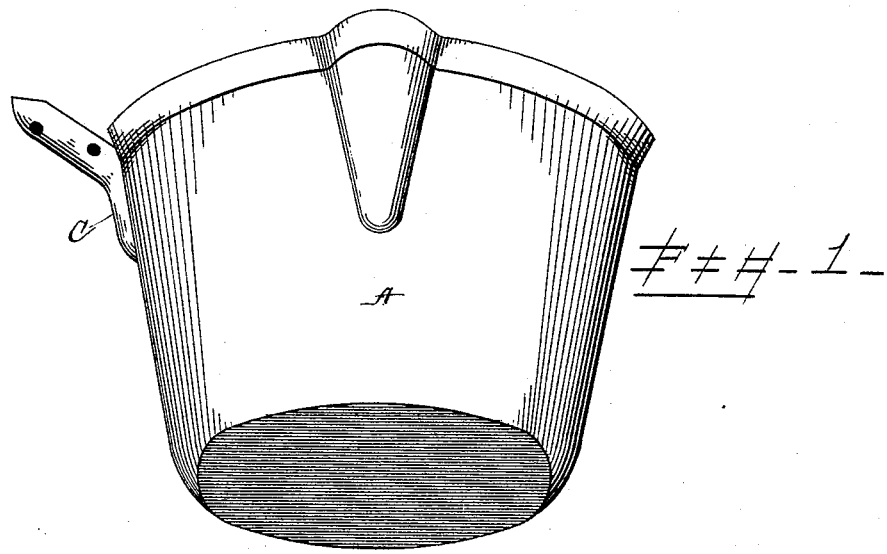
Figure 2:
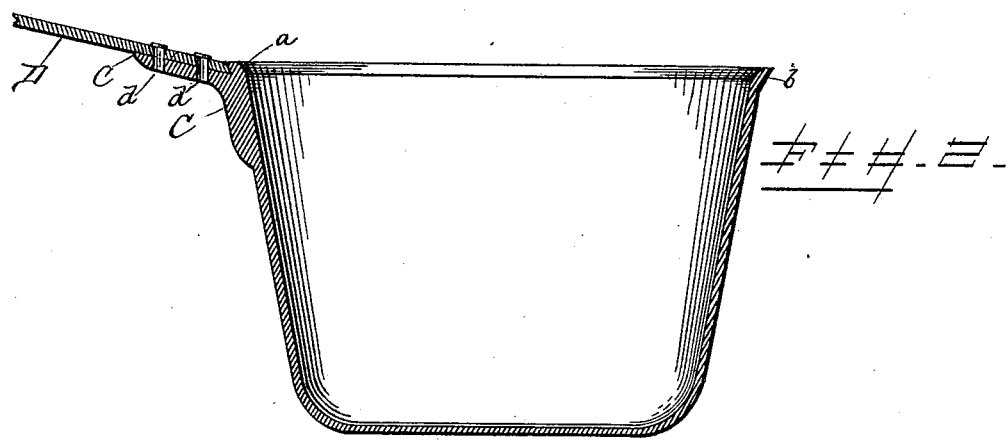

Referring to the accompanying drawings, in which Figure 1 is a perspective and Fig. 2 a vertical sectional view of my improved pan.

A represents the body of the pan, which is of the ordinary and well-known contour, except as to the upper edge, which, instead of being rounded, is slightly flared, as shown at $a$, and is flat on top, its outer edge, $b$, forming an acute angle with the body of the vessel, so as to form a V-shaped flange. This peculiar shape of the flange edge not alone renders the pan stronger and much easier to clean, but it also reduces the cost of manufacture, as it is more difficult to prepare the molds for the round-edge pans, and the operation of casting and finishing them is more difficult and expensive than in the present shaped edge, which necessarily adds to the cost of the complete article.

The lug or ear C, to which the handle D is attached by rivets or screws $d\ d\ d'$, which pass through the handle and into the ear or lug, is cast integral with the body of the vessel, its top $c$ being a sufficient distance below the upper edge or rim of the pan, so that when the handle is in position its top will be flush with the top of the rim, its lower end pressing against the rim and serving to retain the handle in position. By casting this lug or ear integral with the body of the vessel and attaching the handle on the top thereof I obviate the necessity of drilling holes in the side of the vessel, as is now done.

Where the handles are attached to the vessel by riveting them to the side of the vessel, it is greatly weakened at the point where the holes are drilled, and this point should, if possible, be the very strongest point, as it is there where the strain is put in lifting the pan.

Another valuable point I attain in attaching the handle to the top of the ear or lug, instead of riveting it to the side of the pan, is that the ear or lug can be made of sufficient thickness, without adding materially to the weight or cost of the vessel, to permit the use of screws in attaching the handle, instead of rivets, thus permitting the vessels to be packed and shipped from the factory with the handles detached, as they can be fastened together by the retailer by simply inserting the screws; but where it was necessary to rivet the handles to the pans this method of packing and shipping could not be followed, as there is great danger of breaking the pans in the operation of attaching the handles by rivets, and as a consequence the riveting had to be done by skilled labor at the factory.

What I claim as new is—

1. As a new article of manufacture, a culinary vessel having an angular or V-shaped flange surrounding its upper edge, and an ear designed and adapted for the attachment of a handle thereto and on top thereof, cast integral with the body of the vessel, its upper edge being on a line with the lower edge of the flange which surrounds the vessel, substantially as shown and described.

2. The combination, with a culinary vessel having a lug or ear on one side thereof and integral therewith, of a handle resting upon and attached to said ear or lug by fastening devices which pass through the handle and into the ear or lug, the inner edge of said handle being beveled, whereby it rests against the outer surface of the flange which surrounds the vessel, substantially as shown and described.

In testimony whereof I affix my signature in presence of two witnesses.

FRANCIS J. TORRANCE.

Witnesses:
    JOS. L. VANCE,
    JAMES A. TOY.